United States Patent [19]

Faulkner et al.

[11] 4,312,462

[45] Jan. 26, 1982

[54] WEIGHING AND DISPENSING UNIT

[75] Inventors: Keith Faulkner, Bexley; David E. Appleford, Romford, both of England

[73] Assignee: Portionmat (Engineering) Limited, Kent, England

[21] Appl. No.: 147,241

[22] Filed: May 6, 1980

[30] Foreign Application Priority Data

May 11, 1979 [GB] United Kingdom ............... 16592/79

[51] Int. Cl.³ ........................................... G01G 13/00
[52] U.S. Cl. ..................................... 222/56; 222/77; 177/122; 177/106
[58] Field of Search ....................... 222/55, 56, 70, 77, 222/59, 63, 199, 64; 177/106, 111, 122

[56] References Cited

U.S. PATENT DOCUMENTS

| | | | |
|---|---|---|---|
| 2,610,726 | 9/1952 | Howard | 222/55 |
| 3,291,233 | 12/1966 | Mayer | 177/122 |
| 3,957,126 | 5/1976 | Hobart | 177/122 |
| 4,171,067 | 10/1979 | Faulkner et al. | 222/36 |

Primary Examiner—H. Grant Skaggs
Attorney, Agent, or Firm—Roylance, Abrams, Berdo & Farley

[57] ABSTRACT

Flowable food is fed by a vibrator unit to a weighing platform which is carried by a weighing support which moves downwardly as the food builds up on the platform, the weighing support and vibrator being temporarily stopped by stops at a location prior to a point corresponding to a preselected weight and thereafter being allowed to continue its weighing movement or discharge food therefrom as the case may be.

10 Claims, 7 Drawing Figures

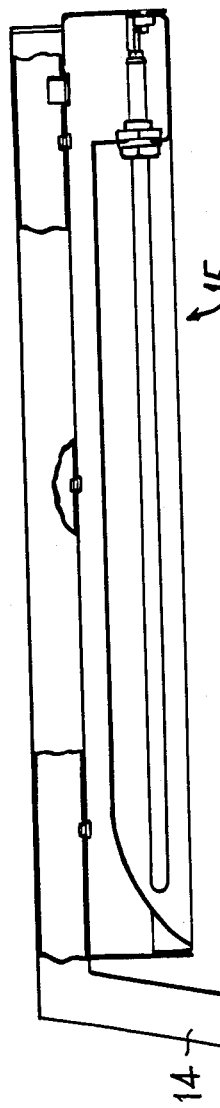
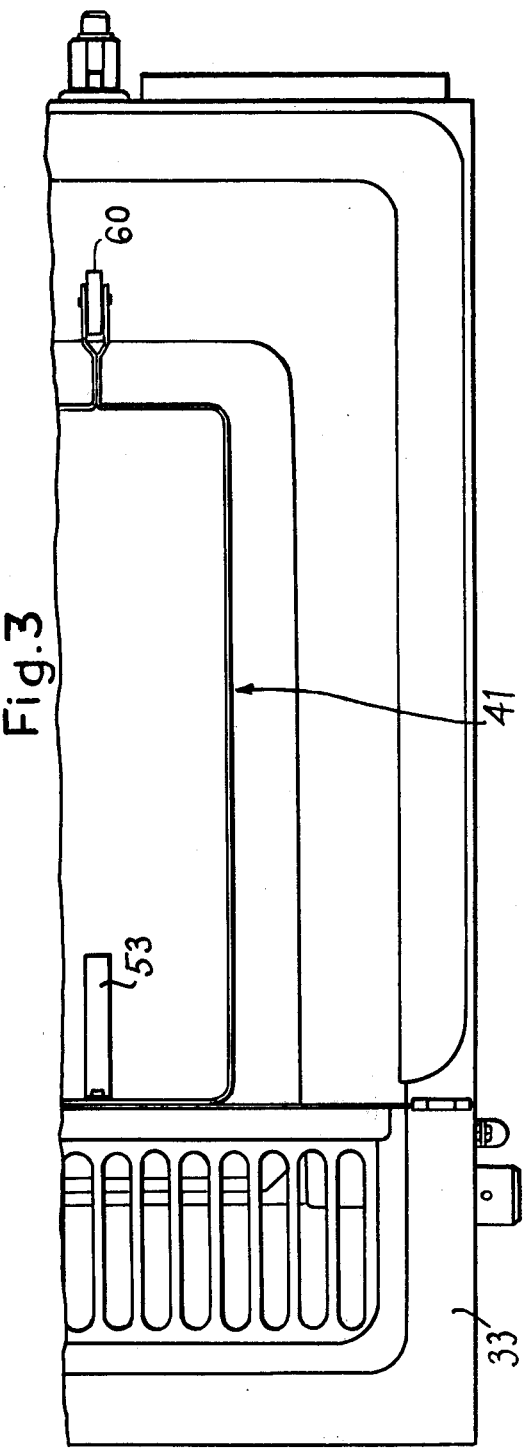

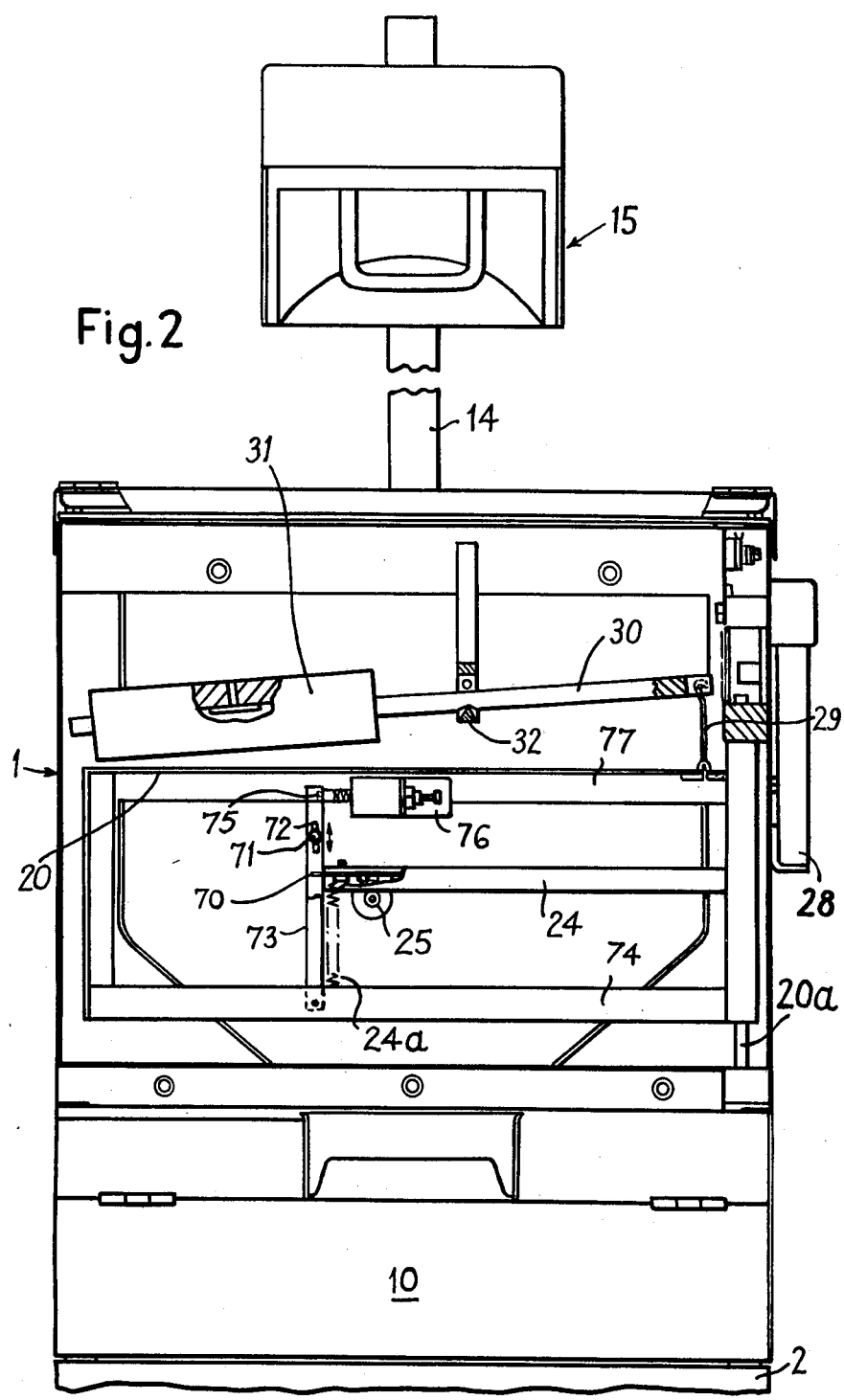

WEIGHING AND DISPENSING UNIT

BACKGROUND OF THE INVENTION

1. Field of the Invention

This invention relates to a unit for weighing and dispensing portions of food, more particularly but not exclusively cooked potato products such as chips/french fries.

2. Description of the Prior Art

In the specification of our U.S. Pat. No. 4,071,097 and co-pending U.S. Pat. Application Ser. No. 119,301 there is disclosed a unit for weighing and dispensing portions of flowable food such as potato chips/french fries from a supply of such food, said unit comprising a receptacle for receiving said supply, a dispensing chamber opening into said receptacle, weighing means including a weighing platform disposed in said dispensing chamber and carried by a movable weighing support, and vibrator means coupled to a bottom wall of the receptacle for feeding food from the receptacle, into the dispensing chamber and onto the weighing platform, the weighing platform being retained in one position to receive the food and being releasable to move into another position to discharge food therefrom in accordance with a predetermined amount of movement of the weighing support corresponding to a preselected weight of food on the weighing platform.

The Applicants have found with weighing and dispensing units constructed as described above that, in certain instances, there is a possibility that the weighing means may weigh light. This is because the weighing movement of the weighing support continues uninterrupted until the weighing platform trips at the point of the preselected weight and thus can be urged suddenly downwards by, for example a heavier amount of food being fed into the platform, causing the latter to trip at a lighter weight than that to which the weighing means has been set.

Accordingly, it is the main object of the present invention to prevent the abovementioned possibility from, or substantially eliminate it, occurring.

SUMMARY OF THE INVENTION

From one aspect, the present invention consists in a unit for weighing and dispensing portions of flowable food which is characterized by means for stopping the weighing movement of the weighing support at a location prior to the point of the preselected weight and simultaneously the vibrator means and thereafter permitting the weighing movement to continue and the vibrator means to operate or the weighing platform to release as the case may be.

By stopping temporarily the downward movement of the weighing support and, simultaneously, stopping the vibrator feed means and then causing the vibrator feed means to feed the food onto the weighing platform again, e.g. at a slower rate, as the weighing support recommences its downward weighing movement, the weighing means performs a weigh which is in accordance with the preselected weight.

Advantageously, the weighing support is supported by an arm on a stop which is adjustable to vary the preselected weight and is biassed against the stop by biassing means, the arrangement being such that the arm always moves the same distance regardless of the preselected weight. This enables the stopping means to include an electrical contact member which is adjustable to stop the weighing movement at a percentage of the preselected weight and which need not be further adjusted to compensate for adjustments of the weight variation.

This means that the contact member can be adjusted to the percentage weigh appropriate to the kind of food being dispensed, e.g. chips may require a different percentage weigh to asparagus tips or nuts, in the factory before the weighing unit is despatched to the customer.

Conveniently, the weighing platform is hinged to the weighing support and is releasable to permit it to hinge downwardly and discharge the food therefrom.

BRIEF DESCRIPTION OF THE DRAWINGS

FIG. 2 is a vertical section taken along the line W—W of FIG. 1, FIG. 3 is a part plan view of the unit.

DESCRIPTION OF THE PREFERRED EMBODIMENT

Figure 1:
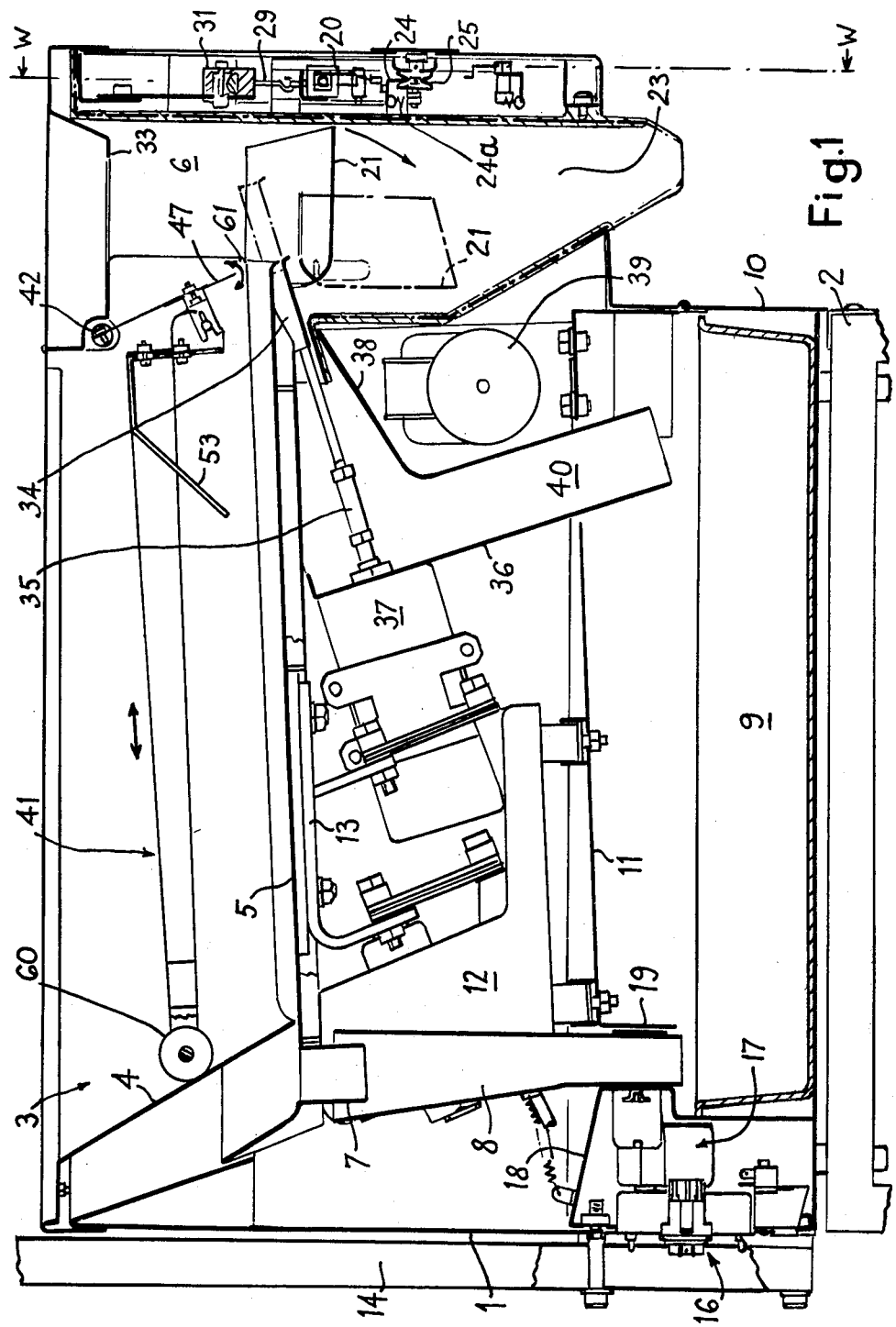
FIG. 1 is a part-sectional side elevational view of a unit for weighing and dispensing hot, fried, potato chips/french fries and incorporating the present invention.

The unit shown in the drawings is generally similar to that described in the specification of our co-pending U.S. Application Ser. No. 119,301 but further includes improvements in accordance with the present invention. Hereinafter, for convenience, potato chips/french fries will be generically referred to as chips.

Referring more particularly to the drawings, the unit comprises a casing 1 which is of generally rectangular shape in plan and is shown as being bolted to a stand 2 which is only partially shown. Disposed in the open top of the casing 1 is a food receptacle 3 having a rear wall which slopes upwardly and outwardly from the separate bottom wall 5 constituting a vibration tray which slopes upwardly in the direction towards the opening of a dispensing chamber 6.

There is a gap between the sloping rear wall 4 of the receptacle and the separate vibration tray 5 which enables hot frying oil or fat to drain through a spout 7 depending from the vibration tray, a funnel 8 and into a collector container 9 resting on the bottom of the casing 1 and removable therefrom through a hinged flap 10 on the front of the casing.

Mounted in the space between the vibration tray 5 and oil collector 9 and bolted to a transverse plate 11 is a commercial vibrator unit 12 with its coupling member 13 in engagement with the underneath of, and supporting, the vibrator tray 5. The back of the casing has secured thereto the column 14 of an electrical, infrared, heating unit 15 disposed above the receptacle for keeping hot fried chips deposited in the receptacle. The column comprises the plug part of a plug and socket connector 16 of which the plug plugs into the socket when the column is bolted to the casing, the connector constituting a safety connection which is disconnected when the column is unbolted or left unbolted for transport purposes. The socket part of the connector is connected to the control circuitry generally indicated at 17 which is disposed in a housing 18. The top wall of the housing 18 is inclined downwardly in the direction of the funnel 8 and there is an opening between the rear end 19 of the transverse plate 11 for the drainage of overspilled oil or fat into the collector 9.

Figure 6:
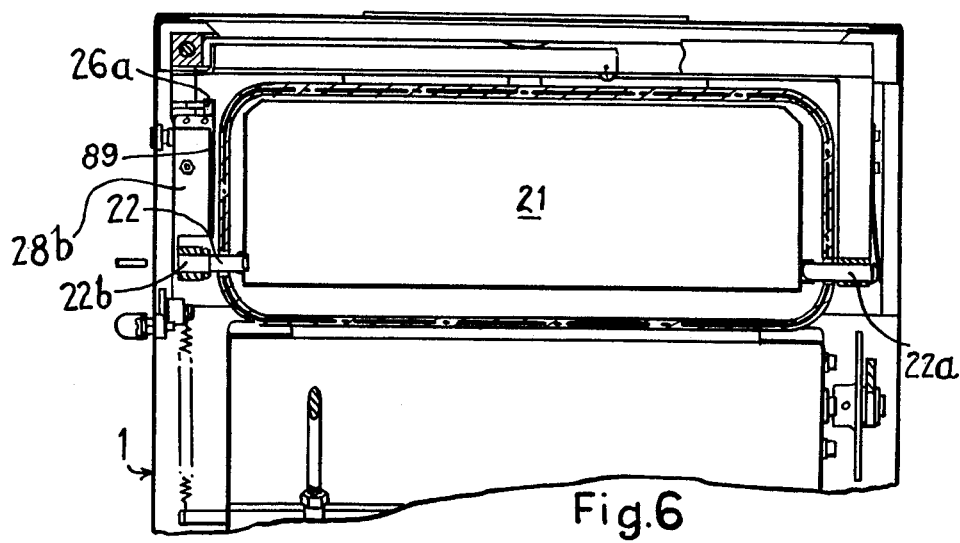
FIG. 6 is a scrap section taken along the line X—X of FIG. 4.
Figure 5:
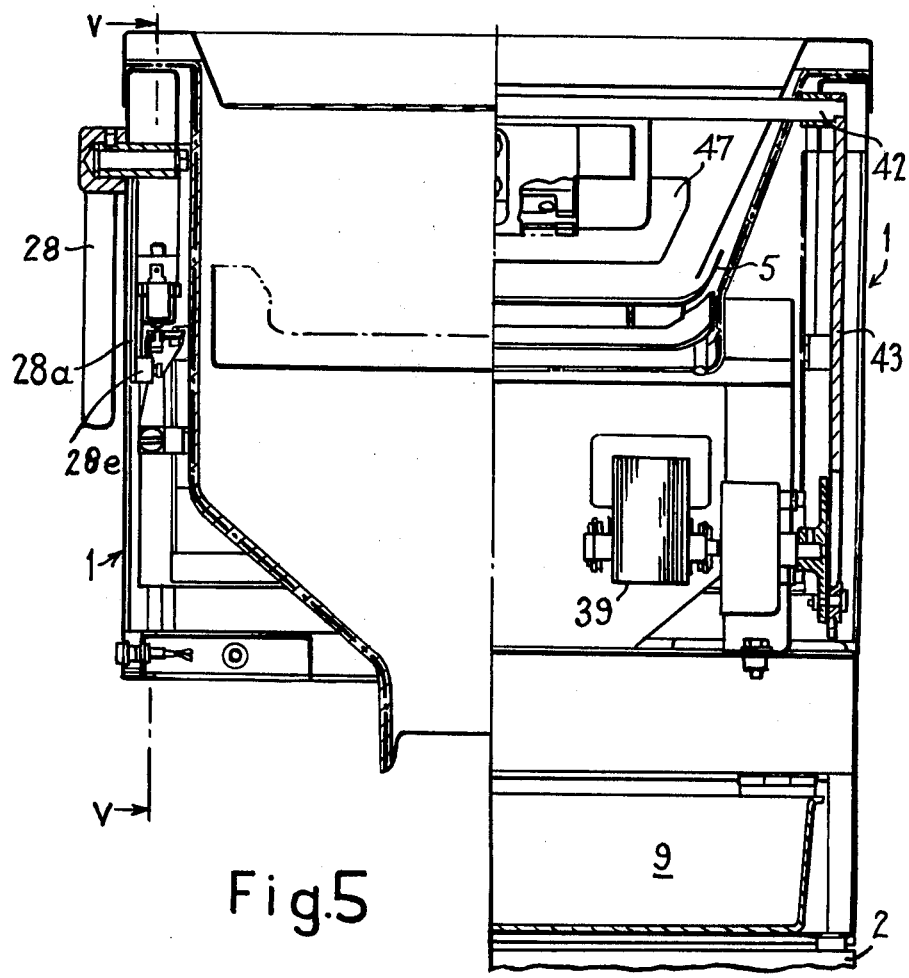
FIG. 5 is a composite cross-sectional view of which the left-hand section is taken along the line Y—Y of FIG. 4 and the right-hand section is taken along the line Z—Z of FIG. 4.

Mounted in the casing forwardly of the dispensing chamber 6 is weighing means constituted by a weighing mechanism which comprises a weighing frame 20 which is disposed outside the dispensing chamber and which is slidably mounted on a shaft 20a at one of its sides for vertical movement. A weighing platform 21 is disposed inside the chamber 6 and is hinged to the weighing frame 20 by hinge pins 22, 22a of which the right-hand pin (FIG. 6) 22a is spring-loaded enabling the weighing platform to be easily removed for cleaning purposes. The weighing platform is disposed just beneath the chamber inlet and occupies a substantially horizontal chip receiving position and is releasable into a substantially vertical position to dispense chips out of the dispensing chamber via a dispensing funnel 23 which terminates in a chamber outlet. The rear wall of the dispensing chamber 6 separates the space containing the vibrator unit 12 from the path taken by the weighed portion of the chips as it is dispensed through the funnel 23 upon release of the weighing platform. The weighing frame 20 is supported, by means of an arm 24, on a stop 25 which is adjustable to vary the weight of the chip portions being dispensed, the arm being biassed against the stop by a spring 24a and being pivoted at its outer end to the weighing frame 20 by a needle bearing 27. The stop 25 is of cotton-reel configuration with the arm being supported on the stop between the reel flanges to prevent angular movements of the frame. The cotton-reel configuration of the stop 25 obviates the necessity for vertical guide slots for the weighing frame in the wall of the dispensing chamber. The pivot pins 22, 22a extend through slots in the side walls of the chamber 6.

Figure 4:
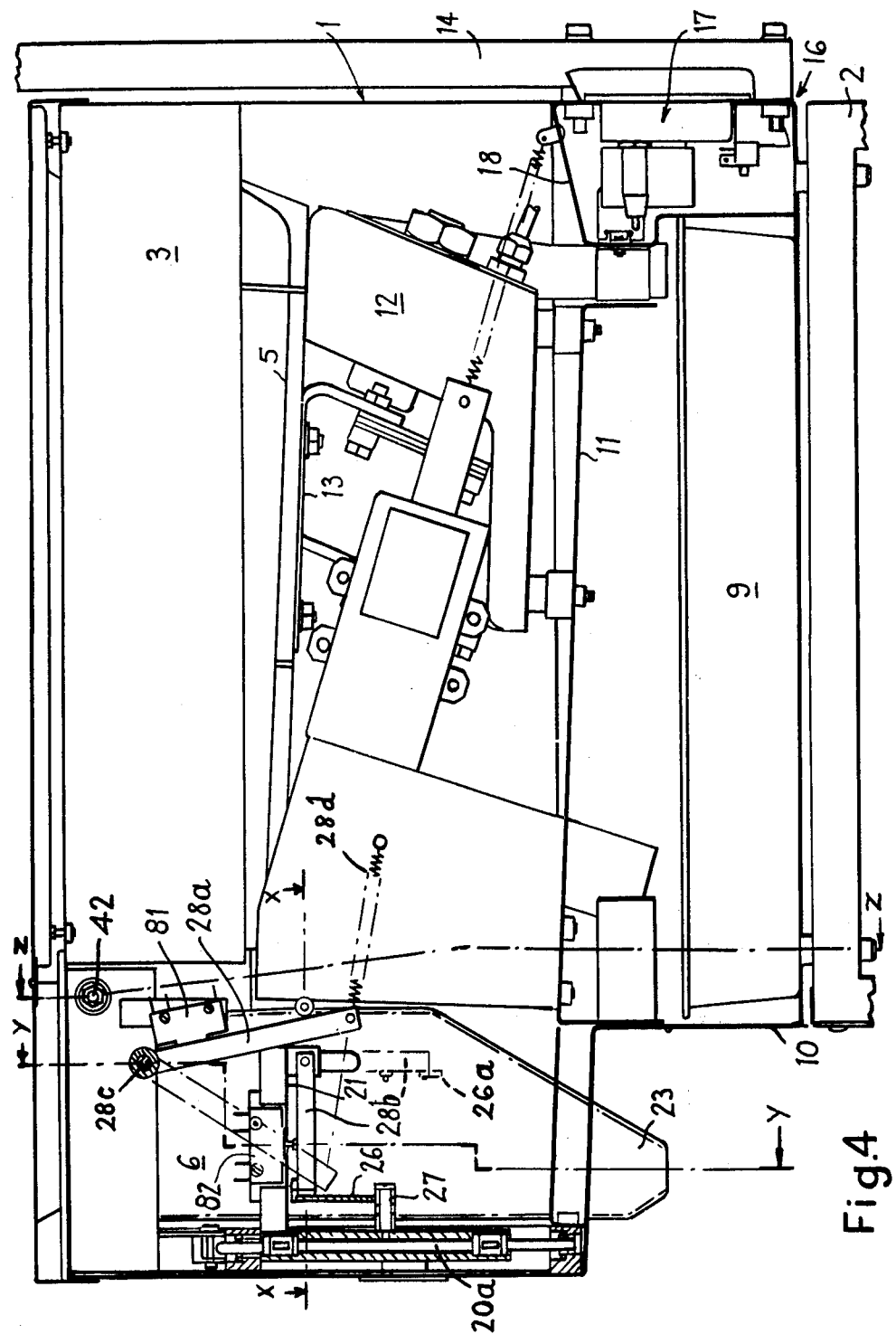
FIG. 4 is a longitudinal section taken along the line V—V of FIG. 5.

The weighing platform is retained in a substantially horizontal chip-receiving position by means of co-operating latch members 26, 26a of which the member 26 has a curved upper end and is fixed to the outer end of arm 24 so that it pivots with the arm about the pivot axis of the needle bearing 27. The latch member 26a is mounted at one end of a springy metal strip 89 which is fixed to a lever 28b forming part of a means to be described for resetting the weighing platform. The end of the lever 28b remote from the latch member 26a is fixed to a pin 22b which engages in a complementary socket in the hinge-pin 22 so as to move therewith yet permit the weighing platform to be detached from the lever 28b when removed for cleaning. As the weighing platform is depressed by the weight of chips on the platform the weighing frame moves vertically downwards. When the releasing point determined by the position of the adjustable stop 25 is reached, the curved upper end of the latch member 26 which is pivotting with the arm 24 as the frame descends disengages from the latch member 26a, whereupon the weighing platform is released and hinges downwardly to dispense a weighed portion of chips. The lever 28b also hinges downwards with the platform 21, to occupy the position shown in chain lines in FIG. 4. Upon discharge of the chips, the weighing frame is restored to its unloaded or rest position by the spring 24a and the weighing platform is reset to its chips receiving position by an external operating handle 28 in readiness for the next weighing and dispensing cycle. The operating handle 28 is fixed by means of a rigid sleeve to the upper end of a reset lever 28a which is disposed inside the casing 1, outside the chamber 6, the sleeve surrounding a pivot pin 28c. At its lower end, the reset lever carries a boss 28e and is connected to a spring 28d which biasses it into the full-line position shown in FIG. 4. When the weighing platform is retained in its chip receiving position by the latch members 26, 26a, a projection on the lever 28b closes a double-pole microswitch 82 to start the vibrator unit 12, providing that a microswitch 81 is also closed by being engaged by the reset lever 28a in its full-line position. After discharge of a weighed portion of chips, the weighing platform 21 and lever 28b occupy a substantially vertical position, the position of the lever 28b being shown in chain lines in FIG. 4, in which the projection on the lever is disengaged from the microswitch 82 to stop the vibrator unit 12. When the handle 28 is operated, reset lever 28a is pivoted into the chain line position shown in FIG. 4, disengaging microswitch 81 and the boss 28e engaging the undersurface of lever 28b to lift the platform 21 into its chips receiving position, with the latch members 26, 26a to co-operating to retain the platform.

The weight of the weighing frame 20 is counterbalanced by means of a wire 29, secured to the frame and to a beam 30 resting on a knife edge 32 and carrying a counterweight 31 which is adjustable along the length of the beam.

An advantage of the unit described is that the latch member 26a is, upon release of the weighing platform, biassed out of the path of upward, resetting movement of the latch member 26 by the springy metal strip 89 such that the latch members 26, 26a interengage only when the platform reaches its horizontal chip-receiving position. This would also be achieved by the latch member 26 being made in two parts of which one part is connected to the other by a springy metal strip and the other part is fixed to the arm 24. In this case, the latch member 26a would be fixed to the lever 28b.

The top of the dispensing chamber 6 is covered by a grill 33 which allows the direct entry of heat from the heating unit 15 to the dispensing chamber to keep it hot, thereby increasing the amount of heat supplied to the dispensing chamber beyond that which would otherwise be transmitted by conduction through the casing.

Although not strictly necessary, optionally, a solenoid-operated shutter 34 may be provided to guard against any possibility of further chips being fed into the dispensing chamber and falling into the funnel 23 after release of the weighing platform 21. The shutter 34 is fixed directly to the solenoid armature 35 which passes through an aperture in a protective plate 36 to which the solenoid 37, which is preferably a D.C. operated solenoid, is bolted so that it lies within the space containing the vibrator 12. A further protective plate 38 covers an electric motor 39 for driving agitating and levelling means to be described. The motor 39 is bolted to the cover plates 36 and 38 and the cover plate/motor assembly is supported on the transverse plate 11. The cover plates 36 and 38 define between them a channel 40 which extends through an aperture in the transverse plate 11 and into the space above the oil collector 9. Thus, any chip bits or oil which are transferred by the shutter as it moves from its gating position shown in chain lines in FIG. 1 where it projects above the weighing platform to its non gating position shown in full lines in FIG. 1, into the space between the transverse plate and the vibrator tray 5, are drained away through the channel 40 keeping the space containing the vibrator, the solenoid and the drive motor for the agitating means free from the chip bits and oil or fat.

The unit also comprises agitator 41 for preventing portions of chips being dispensed which are greater than the preselected weight determined by the adjustable stop 25, caused by bodies of stuck-together chips being fed onto the weighing platform. The chips in the receptacle 3 are agitated by means of the agitator 41 which is in the form of a rectangular open frame-like structure supported in the receptacle from an angularly movable spindle 42 journalled in bearings between and side panels of the casing 1 in a position above the rearwards of the dispensing chamber inlet. The spindle is moved angularly over a range for example of about 10 to 20 degrees by means of an arm 43 fixed to one of the ends of the spindle at its upper end and connected at its lower end to the drive motor 39. An adjustable levelling plate 47 is connected to the spindle 42 and to the agitator frame. A breaker member 53 is fixed to the agitator frame 41 and facilitates the separation of stuck-together bodies of chips which have not been fully broken up or separated by the agitator frame.

As the drive spindle 42 is angularly moved by the drive motor 39 and interconnecting linkage, the levelling plate 47 is pivoted backwards and forwards about the axis of the spindle in the direction given by the arrow heads 61. The pivotal movement of the levelling plate 47 to the agitator together with the movement of the wheel 60 along the outwardly inclined rear wall 4 of the receptacle 3 causes a composite movement of the agitator frame 41 involving movement backwards and forwards in the direction towards and away from the chamber inlet and also upwards and downwards as the rearwards and forwards movements respectively take place.

The unit has a built in weighment check to guard against the weighing means weighing light, provided by means for stopping the downward movement of the weighing support before the weighing support reaches the point of the preselected weight and thereafter permitting the weighing movement to continue. In the preferred embodiment of the invention shown in the drawings, the stopping means comprises means for sensing the location at which the weighing frame reaches a percentage of the preselected weigh constituted by two co-operating electrical contacts 70, 71 which are normally separated. One electrical contact 70 is in the form of a copper strip fixed to the arm 24 of the weighing frame 20. The other electrical contact 71 for co-operation with the contact 70 is adjustably mounted in a slot 72 in a lever 73 disposed in a substantially vertical position as illustrated in FIG. 2. The lever 73 is pivoted at its lower end to the bottom member 74 of the weighing frame and, at its upper end is fixed to the armature 75 of a weighment solenoid 76 mounted on the upper member 77 of the weighing frame. The armature 75 of the solenoid is spring-loaded towards the left as illustrated in FIG. 2. It will be appreciated that, as the weighing frame moves downwardly in response to chips being received on the weighing platform 21, the contact 70, will approach contact 71 and engage therewith to close the switch constituted by the contacts and stop the movement of the weighing frame when the weighing frame has moved vertically over a distance corresponding to a percentage preset by the adjustable contact 71, of the preselected weight set by the stop 25. Thus, the contact 70 on the arm 24 acts as a stop. Since the adjustment of the preselected weight is carried out by movement of the stop 25 along the arm 24, the arm 24 biassed against the stop 25 always moves over the same distance whatever the position of the stop 25 along the arm 24. This means that the adjustable contact 71 can be set at a percentage of the preselected weight for stopping of the vertical downward movement of the weighing frame to provide the weighment facility and can remain thus set whatever the position of the stop 25. This is a considerable advantage since it obviates the necessity for adjusting the contact 71 each time the stop 25 is adjusted to vary the weight of the portion of the chips weighed and dispensed by the unit. The springy metal strip 89 also prevents the contacts 70 and 71 from engaging during the upward resetting movement of the weighing platform.

Figure 7:
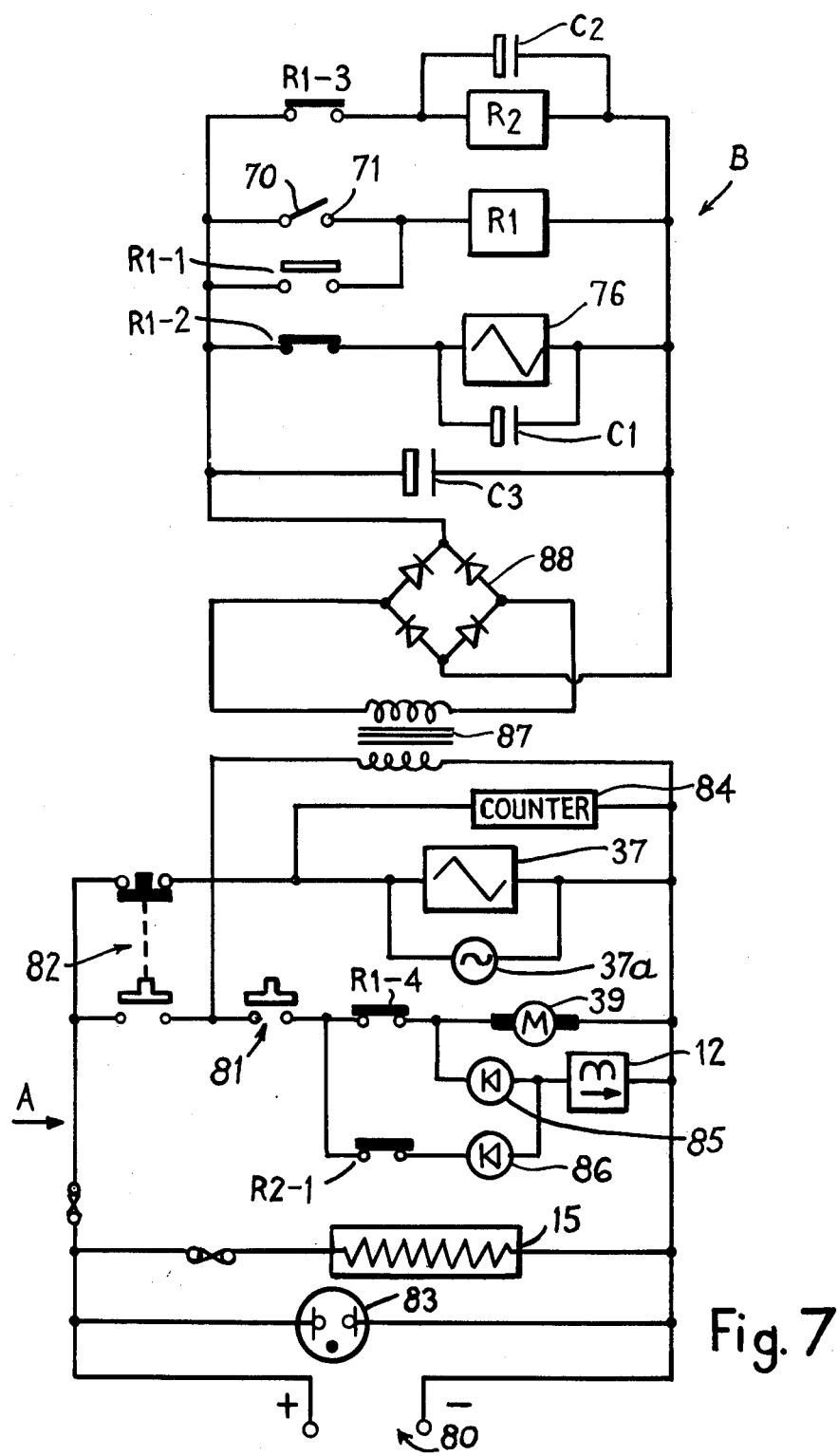
FIG. 7 is a diagram of one form of electrical control circuit for the unit of FIGS. 1 to 6.

The control circuit for operating the weighing and dispensing unit is shown in FIG. 7 and comprises a main control circuit A and a weighment circuit B. The control circuit is connected by a suitable three pin plug to a socket of the domestic mains supply, conveniently through a manual switch (not shown) through terminals 80. Connected into the main control circuit A, are the microswitch 81 actuated by the reset lever 28a and the double-pole microswitch 82 actuated by the platform lever 28b (see also FIG. 4), a neon warning light 83, a counter 84 for counting the number of portions weighed, the heating unit 15, the vibrator unit 12, the shutter solenoid 37, agitator motor 39, a voltage regulator 37a for the solenoid 37, first and second adjustable speed controllers 85 and 86 for the vibrator unit, which are respectively operated by contacts R1-4 and R2-1 under the control of relays R1 and R2 respectively in the weighment circuit B. The weighment circuit B includes a balancing capacitor C3 and is supplied with electricity from the circuit A through a step-down transformer 87, the current from which is rectified by a rectifying bridge 88 and the solenoid 76 is connected into the weighment circuit.

The operation of the unit and weighing means will now be described with particular reference to FIG. 7. All the switches shown in FIG. 7 are shown in the positions which they normally occupy at rest, into which positions the switches are spring biassed, the positions being shown in black in the drawing. At supply switch on and, in the unloaded condition of the weighing platform 21, the weighing frame is urged by the action of the spring 24a, weighing arm 24 and stop 25 into a position in which the weighing platform 21 is biassed into the position illustrated in FIG. 1, just beneath the forward edge of the vibrator tray 5, and in which the microswitch 81 is closed and the microswitch 82 is in one of its positions (the lower position illustrated in FIG. 7) whereby the switches pass electric current to the vibrator unit 12 through the normally closed contact R1-4 and speed controller 85. Also, at supply switch-on, the weighment circuit B is supplied with electricity, contact R1-3 occupies the closed position illustrated, the solenoid 76 is energized by the normally closed contact R1-2 holding the solenoid armature 75 in against the action of its spring so that the lever 73 is held with the contact 71 in the path of movement of the contact 70 on the weighing arm 24, and relay R2 is energized causing contact R2-1 for the speed controller 86 to open.

As the chips are fed onto the weighing platform by the action of the vibrator unit 15, the platform and weighing frame are gradually depressed, following a substantially linear path, against the action of the spring 24a and, at the same time, the weighing arm 24 is moved in a clockwise direction about its pivot on the weighing frame by the stop member 25, thereby tending to disengage the latch members 26 and 26a from each other. The end of the arm carrying the switching contact 70 moves upwards as the weighing frame descends and, at the preselected percentage weigh, for example 80 to 90%, engages the switching contact 71, resulting in energization of relay R1 which closes the contact R1-1. Energization of the relay R1 causes contact R1-2 to open and thus de-energization of the solenoid 76 whose armature is released and, by the action of its spring, moves the lever 73 about its pivot, to the left as illustrated in FIG. 2, to disengage the contacts 70, 71. The capacitor C1 ensures that the de-energization of the weighment solenoid 76 and thus the disengagement of the contacts 70, 71, occurs with a time delay, thereby to stabilize the weighing support in a temporarily stopped position so that the weighing means does not weigh light. Relay R2 is de-energized when contact R1-3 opens (due to R1 being energized as previously stated). Contact R1-4 is also opened by relay R1 energizing, thereby opening circuit to the first speed controller 85 and switching off of the vibrator unit 12 to stop the feed of chips to the weighing platform and also to stop the agitator motor 39. The capacitor C2 ensures that the relay R2 de-energizes with a time delay, to pivot the weighment lever 73 to the left as illustrated in FIG. 2 and disengage contact 71 from contact 70 so that if the weight of the chips on the platform has reached or is slightly above the preselected weight there is time for the latch members to release the platform to discharge the weighed portion of chips therefrom before the contact R2-1 for the second speed controller 86 is closed to recommence the feed of chips to the weighing platform and for the weighment lever 73 to move out of the way. On the other hand, if the weigh is still light, completion of the timing out phase of the relay R2 will cause the contact R2-1 for the speed controller 86 to close. The speed controller 86 may be arranged to cause feeding of chips onto the weighing platform at the same, a faster or slower rate than the speed controller 85, causing the weighing platform to descend for the remainder of the weigh, e.g. to 10 to 20%. If necessary, the speed controller 86 may be arranged to feed a tricle of chips, e.g. as little as one at a time. During this time, the agitator 41 is inoperative since the agitator motor is out of circuit due to the contact R1-4 remaining open. Alternatively, the circuit B could be arranged such that the agitator motor is restarted when the speed controller 86 is switched on.

When the preselected weight of chips has been delivered on to the platform, the weighing frame overcomes the tension in the spring 24a and is depressed to the extent required to release the latch members, whereupon the platform swings downwardly about its hinge to discharge the portion of chips thereon into the dispensing funnel 23. Simultaneously, the downwardly hinging platform actuates the microswitch 82, switching it to its other position (the upper position shown in FIG. 7) in which both the circuit B and vibrator unit are switched off and in which current is supplied to the solenoid 37 through the microswitch 82, energizing the solenoid to move the shutter 34 into a gating position.

The switch 82 also supplies current to the counter to record the portion delivered. The chips discharged into the dispensing funnel may be collected in a bag or on a plate held underneath the lower end of the funnel. Upon discharge of the chips, the weighing frame is restored to its unloaded or rest position by the spring 24a in readiness for its next weighing and dispensing cycle. However, the next cycle is not commenced until the platform is reset in its horizontal position.

When another portion of chips is required, the resetting handle 28 is moved to lift and relatch the weighing platform 21 in its original substantially horizontal chip-receiving position and this also allows the switch 81 to move to its original open position by disengagement of the reset lever 28a therefrom. Thus, during resetting of the platform, which returns the microswitch 82 to its original position, supply of current to the vibrator unit 12 is prevented by the action of the reset lever 28a opening the microswitch 81. Movement of switch 82 to its lower position (FIG. 7) shuts off supply of current to the counter 84 and to the solenoid 37 which moves back to its non-gating position under the influence of a spring. Movement of the reset lever 28a back to its original position closes the microswitch 81 signifying the end of the reset cycle. The position of the microswitch 81 in the circuit A is chosen so that should the resetting handle 28 be tampered with by an operator during discharge of the chips, circuit B remains energized, thereby permitting the vending cycle to remain held in but preventing operation of the vibrator unit and agitator motor.

Although a particular embodiment has been described, various modifications may be made without departing from the scope of the invention. For example, the capacitors C1 and C2 may be replaced by electronic timers. Furthermore, the control circuit may be replaced by any other suitable control circuit, for example one which is controlled by a microprocessor. Moreover, the weighment solenoid may be replaced by other suitable electrical means such as an electromagnetic latch.

We claim:
1. A unit for weighing and dispensing portions of flowable food for a supply of such food, said unit comprising a receptacle for receiving said supply, a dispensing chamber opening into said receptacle, weighing means including a weighing platform disposed in said dispensing chamber and carried by a movable weighing support, and vibrator means coupled to a bottom wall of the receptacle for feeding food from the receptacle into the dispensing chamber and onto the weighing platform, the weighing platform being retained in one position to receive food and being releasable to move into another position to discharge the food therefrom in accordance with a predetermined amount of movement of the weighing support corresponding to a preselected weight of food on the weighing platform, characterized by means for stopping the weighing movement of the weighing support at a location prior to the point of the preselected weight and simultaneously the vibrator means and thereafter permitting the weighing movement to continue and vibrator means to operate or the weighing platform to release as the case may be.

2. A unit as claimed in claim 1, characterized in that the weighing support is supported by means of an arm which is pivoted thereto and which rests on a stop which is adjustable to vary the preselected weight, the arm being resiliently biassed against the stop and always being movable the same distance regardless of the position of the stop.

3. A unit as claimed in claim 2, characterized in that the arm carries a latch member which pivots with the arm and co-operates with a latch member carried by a lever connected to the weighing platform outside the dispensing chamber for use in resetting said platform to said one position, said latch members co-operating to hold the platform in said one position and one of said members being resiliently biassed out of the path of resetting movement of the weighing platform such that the latch members interengage only when said platform reaches its said one position.

4. A unit as claimed in claim 2, characterized in that the stop has side flanges between which the weighing arm rests on the stop, in that the weight of the weighing support is counterbalanced by suspension from a beam supported on a knife edge and carrying a counterweight which is movable therealong, in that the weighing platform is hinged to the weighing support by means permitting removal of the platform from the dispensing chamber for cleaning purposes, in that a lever is fixed to the hinge outside the dispensing chamber, for use in resetting the weighing platform and co-operates with first switching means for operating the vibrator means, such that, in said one position of the platform, the lever engages the switching means and in said other position of the platform, the lever is disengaged from the switching means, and in that another lever is pivotally moveable from a first position in which it engages a second switching means, to co-operate with the first mentioned lever and reset the platform to its said one position, said another lever being disengaged from the second switching means to render the first switching means inoperative when it is moved from its first position and in that the hinge includes two hinge members disposed at opposite sides respectively of the weighing support, one of said members being resiliently loaded and the other of said members being detachably connected to said lever.

5. A unit as claimed in claim 1, characterized in that the means for stopping the weighing movement of the weighing support includes electrical means for sensing said location of the weighing support.

6. A unit as claimed in claim 5, characterized in that the electrical sensing means includes two electrical contacts which are normally separated but are engageable to stop the weighing movement of the weighing support and vibrator means.

7. A unit as claimed in claim 5, characterized in that the weighing support is supported by means of an arm which is pivoted thereto and which rests on a stop which is adjustable to vary the preselected weight, the arm being resiliently biassed against the stop and always being movable the same distance regardless of the position of the stop and in that one of said contacts is mounted on said arm.

8. A unit as claimed in claim 7, characterized in that the other contact is adjustably mounted on a lever which is pivoted at one of its ends to the weighing support, and in that means are provided for moving the lever out of a position in which the other contact is disposed in the path of movement of said one contact to disengage said contacts after the weighing support reaches said location.

9. A unit as claimed in claim 8, characterized in that the means for moving the lever is an electrical solenoid or magnetic latch which is mounted on the weighing support and which is connected to the other end of the lever.

10. A unit as claimed in claim 8, characterized in that said means for stopping the weighing movement of the weighing support further includes an electrical control circuit connected to said vibrator means, said contacts and said means for moving the lever, said circuit being operative to actuate the lever moving means to disengage said contacts with a time delay, to stop the vibrator means and subsequently after a time delay period either to re-start the vibrator means or release the weighing platform.

* * * * *